US010116245B2

(12) United States Patent
Fukuda et al.

(10) Patent No.: US 10,116,245 B2
(45) Date of Patent: Oct. 30, 2018

(54) COMPRESSOR DRIVING DEVICE, COMPRESSOR INCLUDING THE SAME, AND REFRIGERATION CYCLE APPARATUS INCLUDING THE COMPRESSOR DRIVING DEVICE AND THE COMPRESSOR

(71) Applicant: Panasonic Intellectual Property Management Co., Ltd., Osaka (JP)

(72) Inventors: Mitsuhiro Fukuda, Shiga (JP); Masaki Sumi, Kyoto (JP); Hiroaki Kase, Shiga (JP); Shigetomi Tokunaga, Shiga (JP); Masamitsu Taura, Osaka (JP); Takayuki Okamoto, Shiga (JP)

(73) Assignee: PANASONIC APPLIANCES REFRIGERATION DEVICES SINGAPORE, Singapore (SG)

( * ) Notice: Subject to any disclaimer, the term of this patent is extended or adjusted under 35 U.S.C. 154(b) by 147 days.

(21) Appl. No.: 15/321,097

(22) PCT Filed: Jun. 19, 2015

(86) PCT No.: PCT/JP2015/003072
§ 371 (c)(1),
(2) Date: Dec. 21, 2016

(87) PCT Pub. No.: WO2015/198569
PCT Pub. Date: Dec. 30, 2015

(65) Prior Publication Data
US 2017/0141709 A1 May 18, 2017

(30) Foreign Application Priority Data
Jun. 24, 2014 (JP) ................................ 2014-128743

(51) Int. Cl.
*H02P 7/06* (2006.01)
*F25B 49/02* (2006.01)
*H02P 6/182* (2016.01)

(52) U.S. Cl.
CPC .............. *H02P 7/06* (2013.01); *F25B 49/025* (2013.01); *H02P 6/182* (2013.01);
(Continued)

(58) Field of Classification Search
CPC ....................................................... H02P 7/06
(Continued)

(56) References Cited

U.S. PATENT DOCUMENTS 5,686,807 A 11/1997 Kusano et al.
6,396,225 B1 * 5/2002 Wakui .................... H02P 6/085
318/400.01

(Continued)

FOREIGN PATENT DOCUMENTS

JP H10150795 A 6/1998
JP 11-004596 1/1999

(Continued)

OTHER PUBLICATIONS

Extended European Search Report issued for related European Patent Application No. 15812831.4, dated Jul. 17, 2017, 8 pages.

(Continued)

*Primary Examiner* — David S Luo
(74) *Attorney, Agent, or Firm* — Hamre, Schumann, Mueller & Larson, P.C.

(57) ABSTRACT

A compressor driving device includes: a controller that PWM drives a compressor; an inverter circuit unit that supplies power to an electric motor included in the compressor; a drive circuit that drives the inverter circuit unit according to a control signal; a voltage detector that detects a voltage that is output to the electric motor; and a current (Continued)

detector that detects a current that is output to the electric motor. When a product of a detection value of the voltage detector and a detection value of the current detector is greater than a predetermined comparison value, a duty ratio of the control signal is reduced to cause the input power supplied to the electric motor by the inverter circuit unit to have a predetermined input power level or less.

10 Claims, 9 Drawing Sheets

(52) U.S. Cl.
CPC ... *F25B 2600/021* (2013.01); *F25B 2700/151* (2013.01); *H02P 2205/03* (2013.01); *H05K 999/99* (2013.01)

(58) Field of Classification Search
USPC ....................................................... 318/3, 34
See application file for complete search history.

(56) References Cited

U.S. PATENT DOCUMENTS

| 2010/0018243 | A1 | 1/2010 | Tanaka et al. |
| 2013/0020973 | A1 | 1/2013 | Ohgushi |
| 2015/0214863 | A1 | 7/2015 | Sumi et al. |

FOREIGN PATENT DOCUMENTS

| JP | 2004-197663 | 7/2001 |
| JP | 2003-111469 | 4/2003 |
| JP | 2010-252591 | 11/2010 |
| JP | 2013-27105 | 2/2013 |
| JP | 2013038855 A | 2/2013 |
| WO | 2014/010225 | 1/2014 |

OTHER PUBLICATIONS

International Search Report (ISR) dated Sep. 1, 2015 in International (PCT) Application No. PCT/JP2015/003072 (13 pages).

* cited by examiner

COMPRESSOR DRIVING DEVICE, COMPRESSOR INCLUDING THE SAME, AND REFRIGERATION CYCLE APPARATUS INCLUDING THE COMPRESSOR DRIVING DEVICE AND THE COMPRESSOR

TECHNICAL FIELD

The present invention relates to a compressor driving device that drives a compressor that uses a brushless DC motor.

BACKGROUND ART

Conventionally, a capacity control valve control apparatus has been proposed that, in order to avoid a rapid pressure increase in a refrigeration cycle circuit, limits an input signal input into a duty ratio control circuit to not have a predetermined duty ratio (see, for example, Patent Literature (PTL) 1).

FIG. 8 shows a conventional capacity control valve control apparatus disclosed in PTL 1. As shown in FIG. 8, the control apparatus includes pulse width modulation (PWM) converter 52 that controls capacity control valve 51 by using a duty ratio, and input voltage limiter circuit 53 that limits a voltage for setting a current that is input into pulse width modulation (PWM) converter 52.

With this configuration, pulse width modulation (PWM) converter 52 that generates a pulse signal having a predetermined duty ratio receives an input of a voltage indicating the predetermined duty ratio that is limited in advance by input voltage limiter circuit 53. For this reason, even if a voltage that excessively increases the pressure at the discharge side of the compressor is set, a pulse signal having a duty ratio greater than or equal to the predetermined duty ratio is not input into capacity control valve 51. Accordingly, it is possible to avoid a rapid pressure increase that may occur at the time of activation of the compressor.

Another capacity control valve control apparatus has also been proposed that limits the scalar value of a voltage applied to an electric motor provided in a compressor to be less than or equal to a maximum output voltage so as to effectively reduce a harmonic component of an input current (see, for example, PTL 2).

FIG. 9 shows a conventional compressor driving device disclosed in PTL 2.

As shown in FIG. 9, the compressor driving device includes rectification means 61 that rectifies an AC voltage from an AC power supply to a DC voltage, power conversion means 62 that converts the DC voltage output by rectification means 61 to an AC voltage and applies the AC voltage to the electric motor, phase current detectors 63a and 63b that detect phase currents flowing into the electric motor, and control means 64 that controls the voltage applied to the electric motor by power conversion means 62.

Control means 64 includes current control means 65 that receives a current command value of current flowing into the electric motor and outputs a voltage command value of the voltage applied to the electric motor based on the current command value, and output voltage limiting means 66 that limits the scalar value of the voltage applied to the electric motor to be less than or equal to the maximum output voltage that is defined by the DC voltage output by rectification means 61.

Current control means 65 includes an integrator. Current control means 65 calculates the voltage command value by performing a control operation including integral control by using the integrator based on the current command value and the outputs of phase current detectors 63a and 63b.

Output voltage limiting means 66 receives the voltage command value from current control means 65, calculates the scalar value of the voltage command value, and limits the voltage applied to the electric motor if the scalar value exceeds the maximum output voltage defined by the DC voltage output by rectification means 61. Also, output voltage limiting means 66 feeds back the amount of limited voltage to current control means 65. Current control means 65 subtracts the amount of limited voltage that has been fed back from output voltage limiting means 66 from the output of the integrator.

CITATION LIST

Patent Literature

PTL 1: Japanese Unexamined Patent Application Publication No. 2004-197663
PTL 2: WO 2014/010225

SUMMARY OF THE INVENTION

Technical Problem

However, with the conventional configurations, when the load becomes greater with respect to the power supply, the influence on noise caused by current changes increases. For this reason, it is necessary to provide a component for reducing noise such as a coil, resulting in a problem of complex configuration.

Also, the following problem arises when control is performed by detecting an input current alone. The frequency of the waveform of the input current varies depending on the number of rotations of the electric motor, and thus the number of peaks of the waveform included in a certain time interval varies. That is, the waveform of the input current has a different density depending on the number of rotations of the electric motor. For this reason, even if the input current is detected in the certain time interval, it is difficult to obtain an accurate current value.

Also, even if the detected value is corrected, it is difficult to obtain an accurate current value by merely performing a correction that simply averages the detected values sampled at a predetermined period during the certain time interval.

The present invention has been made to solve the problems encountered with the conventional techniques, and the present invention can control input power that is input to a compressor or an electric motor to be constant around a predetermined value by focusing on and controlling a product of a detection value detected by an input voltage detector and a detection value detected by an input current detector. It is thereby possible to provide a highly reliable compressor driving device that can safely operate a compressor without shutting down the compressor.

Solution to Problem

In order to solve the problems encountered with the conventional techniques described above, a compressor driving device according to the present invention includes: a power conversion circuit that supplies power to an electric motor included in a compressor; a drive circuit that drives the power conversion circuit according to a control signal; a voltage detector that detects a voltage that is output to the electric motor; a current detector that detects a current that is output to the electric motor; and a controller, wherein when a product of a detection value of the voltage detector and a detection value of the current detector is greater than a predetermined comparison value, the controller reduces a duty ratio of the control signal and cause the power supplied to the electric motor by the power conversion circuit to have a predetermined power level or less.

With this configuration, even in the event of an overload or a rapid rotational variation caused by a voltage variation or a load variation, it is possible to perform constant input power control and safely operate the compressor without shutting down the compressor.

Advantageous Effect of Invention

The compressor driving device according to the present invention can perform constant input power control even in the event of an overload by using inexpensive current detection means. For this reason, the compressor is safely operated without being unnecessarily shut down.

DESCRIPTION OF EXEMPLARY EMBODIMENT

Figure 1:
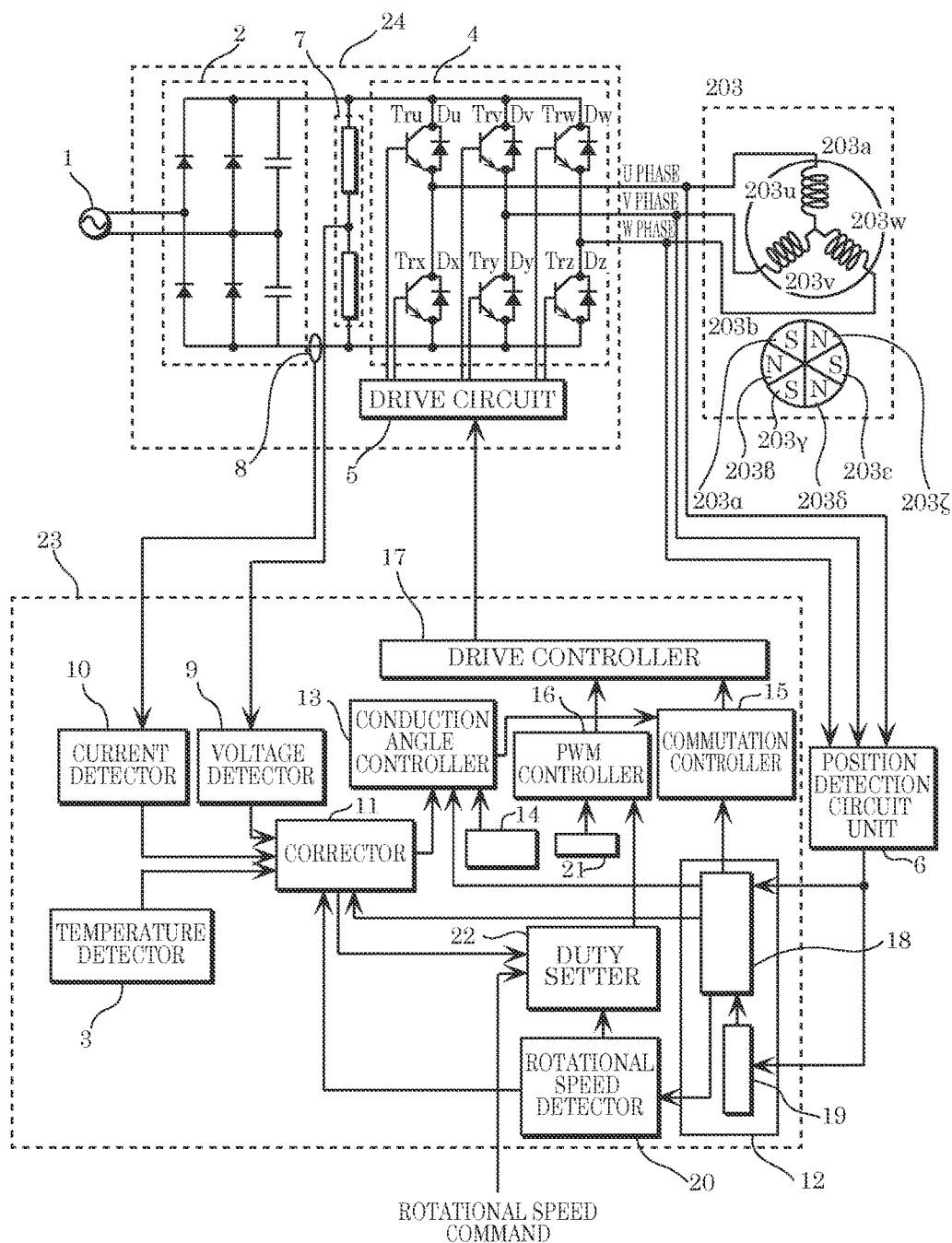
FIG. 1 is a block diagram of a compressor driving device according to Embodiment 1 of the present invention.

A first aspect of the invention relates to a compressor driving device including: a power conversion circuit that supplies power to an electric motor included in a compressor; a drive circuit that drives the power conversion circuit according to a control signal; a voltage detector that detects a voltage that is output to the electric motor; a current detector that detects a current that is output to the electric motor; and a controller, wherein when a product of a detection value of the voltage detector and a detection value of the current detector is greater than a predetermined comparison value, the controller reduces an on-duty ratio of the control signal and cause the power supplied to the electric motor by the power conversion circuit to have a predetermined power level or less.

With this configuration, even in the event of an overload, it is possible to control input power that is input to the compressor to be constant by using inexpensive current detection means. For this reason, the compressor is operated safely without unnecessarily being shut down.

Since the number of rotations of the electric motor is reduced by suppressing the duty ratio, the electric motor can be driven with the number of rotations that is as close as possible to the target number of rotations before the number of rotations is reduced by the constant input power control.

Also, by intentionally suppressing the input power that is input into the compressor, it is possible to reduce the harmonic component that increases in proportion to the input power that is input into the compressor. For this reason, it is possible to deal with harmonic regulation in an inexpensive manner without particularly providing an additional component.

Furthermore, it is possible to deal with harmonic regulation without using a heavy component such as a reactor. For this reason, reliability against impact and vibration during transportation of the compressor driving device is enhanced.

A second aspect of the invention is configured such that, in particular, in the first aspect of the invention, a corrector is provided that corrects, according to the number of rotations of the electric motor, either the product of the detection value of the voltage detector and the detection value of the current detector or the comparison value.

As a result of applying correction according to the number of rotations, it is possible to perform a correction that takes into consideration the density of the waveform of the input current. For this reason, even if the current detector is formed by using an inexpensive configuration, for example, a configuration that amplifies a micro current flowing into a shunt resistor by using an operational amplifier or the like, it is possible to control the input power that is input into the compressor to be constant.

A third aspect of the invention is configured such that, in particular, in the first aspect of the invention, a corrector is provided that corrects, according to a conduction angle of the electric motor, either the product of the detection value of the voltage detector and the detection value of the current detector or the comparison value.

As a result of applying correction according to the conduction angle, it is possible to control the input power that is input into the compressor to be constant, taking into consideration a loss (substrate loss) on the electronic circuit substrate caused as a result of another phase and energization being overlapped with each other when a conduction angle of 120 degrees or more is applied.

A fourth aspect of the invention is configured such that, in particular, in any one of the first to third aspects of the invention, the electric motor is a brushless DC motor including a rotor provided with a permanent magnet and a stator provided with a three-phase winding, and the controller PWM drives the electric motor at a three-phase output voltage.

With this configuration, it is possible to suppress an increase in the current flowing into the brushless DC motor caused by an overload. Also, the PWM drive control requires rotational position information regarding the rotational position of the rotor in order to perform commutation control, rotational speed calculation and conduction angle control, but with this compressor driving device, the position detection circuit unit can easily detect the zero crossing point.

For this reason, the reliability of rotational position detection is enhanced, and stable drive control can be performed. It is thereby possible to perform PWM drive control that uses a brushless DC motor having a high operational reliability.

Also, as a result of the reliability of rotational position detection being enhanced, the rotor phase does not shift due to a change in the conduction angle, and thus the rotation of the electric motor is stabilized. For this reason, even when there is a change in the substrate loss due to the shift of the rotor phase, it is possible to control the input power that is input into the compressor to be constant.

A fifth aspect of the invention is configured such that, in particular, in the first aspect of the invention, the controller adjusts a conduction angle of the control signal according to a length of time during which a reverse induction voltage is applied from the electric motor.

When the controller adjusts the duty ratio of the control signal, the length of time during which the reverse induction voltage is applied is changed. By adjusting the conduction angle according to this time period, the phase difference between voltage and current can be controlled to be within a predetermined value.

For this reason, even when an IPM motor is used, the input power that is input into the compressor can be controlled to be constant without any influence of the load torque that is changed due to the shift of the rotor phase.

A sixth aspect of the invention is configured such that, in particular, in the first aspect of the invention, the controller uses, as the detection value of the voltage detector or the detection value of the current detector, a detection value whose amount of change from an immediately preceding detection value is less than or equal to a first threshold value.

With this configuration even when there is an instantaneous variation in voltage or current, it is possible to continue operation in a stable manner.

A seventh aspect of the invention is configured such that, in particular, in the first aspect of the invention, a temperature detector is provided that detects a temperature of the compressor, and the controller reduces the duty ratio when a detection value of the temperature detector is greater than a predetermined value.

As a result of detecting the temperature of the compressor, it is possible to predict that an excessively large load is applied to the compressor.

An eighth aspect of the invention relates to, in particular, a compressor in which the compressor driving device according to any one of the first to seventh aspects of the invention is attached in contact with an outer shell of the compressor.

With this configuration, it is possible to increase an effective space in the refrigeration cycle apparatus. Also, the degree of freedom of selecting a storage area for storing the compressor driving device in the refrigeration cycle apparatus is enhanced.

A ninth aspect of the invention relates to a refrigeration cycle apparatus including: a refrigeration cycle circuit including a compressor, an evaporator, a decompressor and a heat dissipator; and the compressor driving device according to any one of the first to seventh aspects of the invention.

A tenth aspect of the invention relates to a refrigeration cycle apparatus including a refrigeration cycle circuit including the compressor according to the eighth aspect of the invention, an evaporator, a decompressor and a heat dissipator.

With this configuration, it is possible to obtain a refrigeration cycle apparatus that can perform a stable continuous operation even in the event of an overload and has a high degree of freedom of selecting a storage area that gives consideration to a storage space and a thermal issue.

Hereinafter, an embodiment of the present invention will be described with reference to the drawings. It is to be understood that the present invention is not limited by the following embodiment.

Embodiment 1

Figure 2:
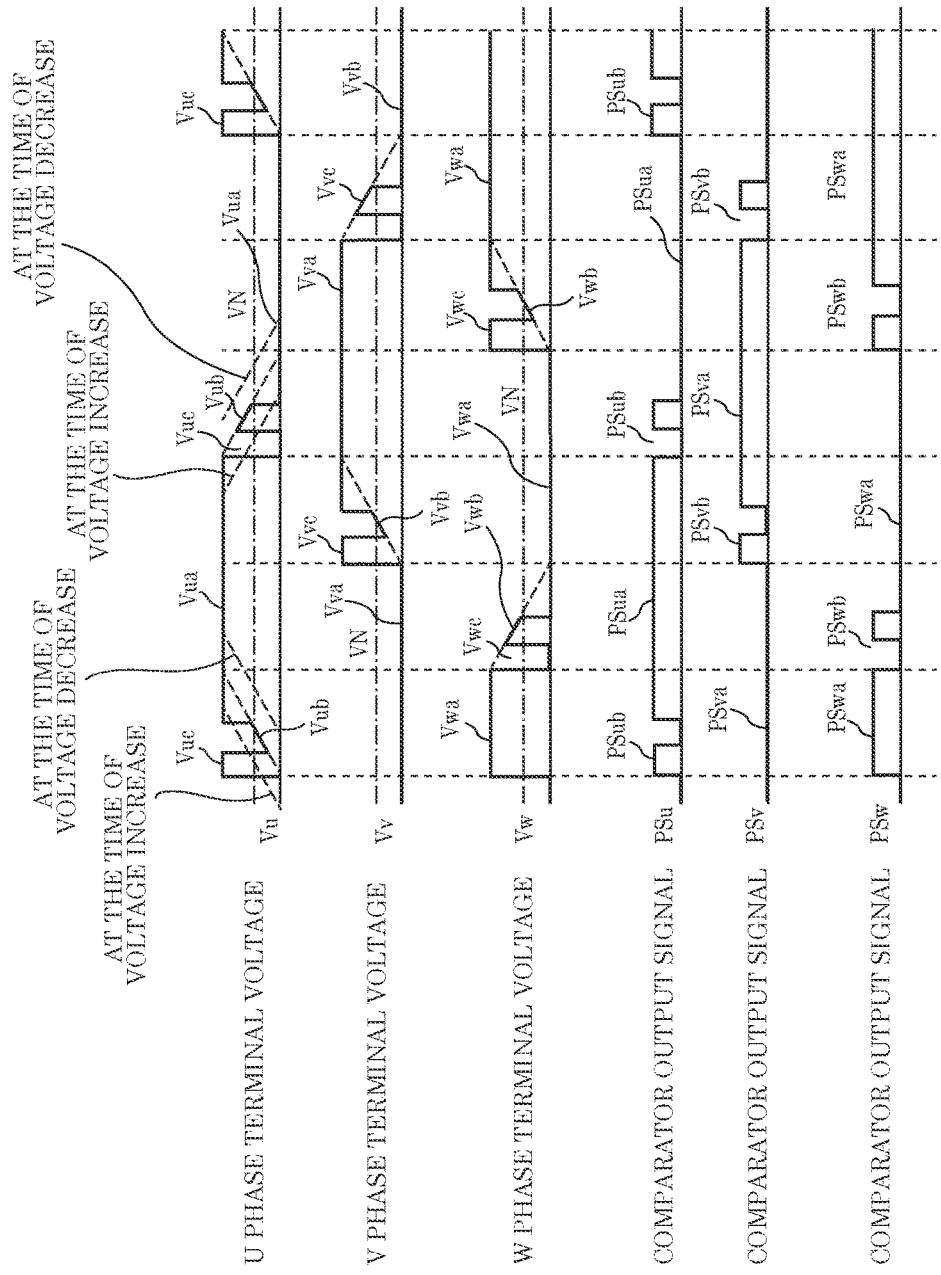
FIG. 2 is a timing chart showing signal waveforms and the content of processing of structural elements in the compressor driving device according to Embodiment 1 of the present invention.
Figure 3:
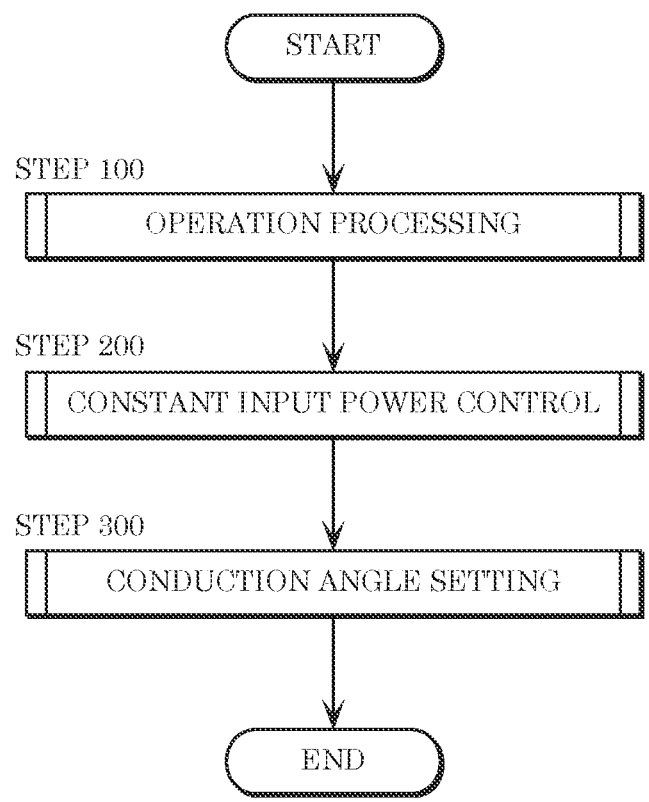
FIG. 3 is a macro flowchart illustrating a series of control operations for constant input power control performed in the compressor driving device according to Embodiment 1 of the present invention.
Figure 4:
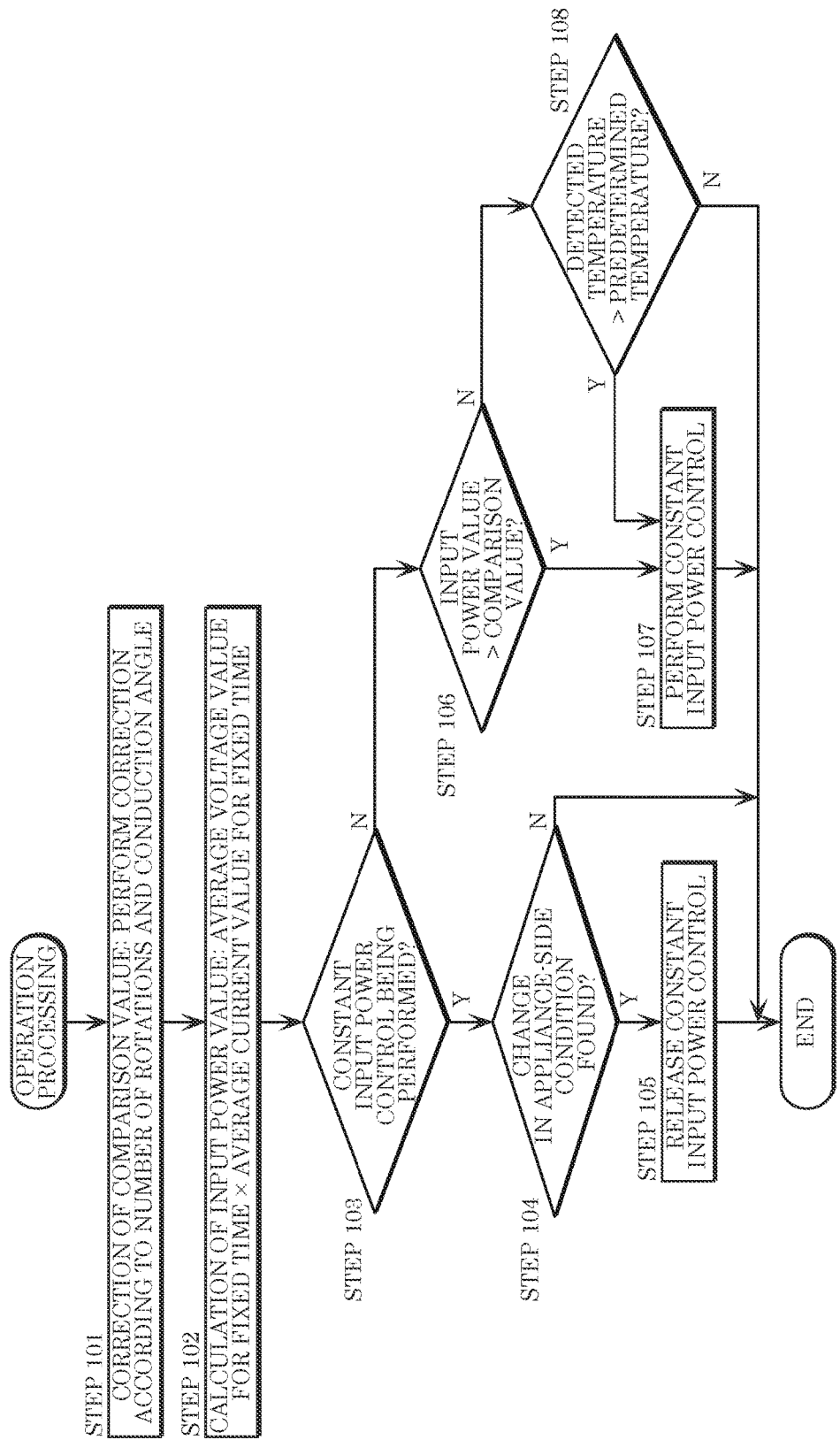
FIG. 4 is a flowchart illustrating control operations for operation processing in the compressor driving device according to Embodiment 1 of the present invention.
Figure 5:
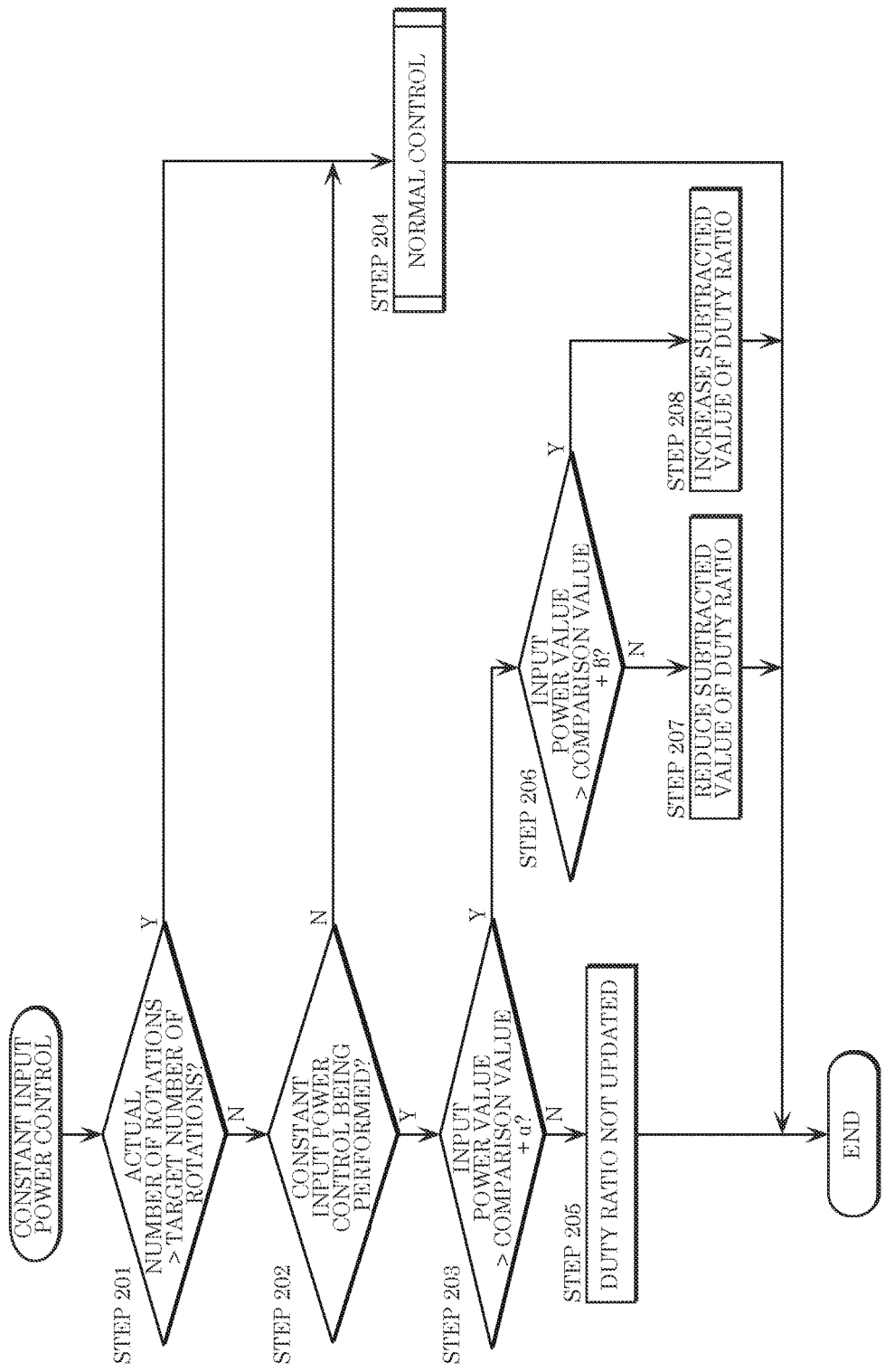
FIG. 5 is a flowchart illustrating the operations for setting a duty ratio for the constant input power control in the compressor driving device according to Embodiment 1 of the present invention.

FIG. 1 is a block diagram of a compressor driving device according to Embodiment 1 of the present invention. FIG. 2 is a timing chart showing signal waveforms and the content of processing of structural elements in the compressor driving device according to Embodiment 1 of the present invention. FIG. 3 is a macro flowchart illustrating constant input power control performed in the compressor driving device according to Embodiment 1 of the present invention. FIG. 4 is a flowchart illustrating operation processing in the compressor driving device according to Embodiment 1 of the present invention. FIG. 5 is a flowchart illustrating constant input power control in the compressor driving device according to Embodiment 1 of the present invention.

In FIG. 1, compressor driving device 24 is connected to commercial AC power supply 1 and an electric compressor (not shown in the diagram, hereinafter referred to simply as "compressor"). The compressor includes brushless DC motor 203 serving as an electric motor. Compressor driving device 24 includes rectifier 2 that converts AC power of commercial AC power supply 1 to DC power, and inverter circuit unit 4 serving as a power conversion circuit that drives brushless DC motor 203.

Furthermore, compressor driving device 24 includes drive circuit 5 serving as a drive circuit that drives inverter circuit unit 4, and position detection circuit unit 6 that detects a terminal voltage of brushless DC motor 203.

Also, compressor driving device 24 includes temperature detector 3.

Compressor driving device 24 includes divider circuit 7 that resistively divides the DC power voltage supplied from rectifier 2 to inverter circuit unit 4, and shunt resistor 8 that detects a current flowing into the electric motor.

Compressor driving device 24 also includes microprocessor 23 serving as a controller that controls inverter circuit unit 4.

Microprocessor 23 includes voltage detector 9 that detects a voltage applied to the electric motor, current detector 10 that detects a current flowing into the electric motor, corrector 11, position detector 12, conduction angle controller 13 that determines a conduction angle, conduction angle update timer 14, commutation controller 15 that generates a commutation signal, PWM controller 16, and drive controller 17 for driving drive circuit 5. That is, microprocessor 23 is control means that drives the compressor at a plurality of numbers of rotations.

Voltage detector 9 detects the voltage applied to the electric motor by detecting a voltage that has undergone division in divider circuit 7. That is, voltage detector 9 is voltage detection means that acquires an input of DC power of the electric motor (drive element) in the compressor.

Current detector 10 detects the current flowing into the electric motor by amplifying the voltage generated in shunt resistor 8 by using an operational amplifier. That is, current detector 10 is current detection means that detects the current value of the current flowing into the compressor.

Temperature detector 3 directly or indirectly detects the temperature of the compressor. In order to directly detect the temperature of the compressor, for example, temperature detector 3 may be provided in contact with the outer shell of the compressor.

Corrector 11 calculates a product (input power value) of the voltage value detected by voltage detector 9 and the current value detected by current detector 10. If the input power value exceeds a comparison value, which will be described later, corrector 11 provides, to duty setter 22, an instruction to suppress the on-duty ratio (the rate of energization) such that the input power into the compressor is substantially equal to the input power value.

Also, corrector 11 provides to duty setter 22 an instruction to suppress the duty ratio according to the detection value detected by temperature detector 3.

Also, corrector 11 provides, to conduction angle controller 13, an instruction to adjust the conduction angle so as to be proportional to the width of the reverse induction voltage that changes according to the duty ratio.

Position detector 12 includes position detection determiner 18 that detects the magnetic pole position of brushless DC motor 203 with respect to the output signal from position detection circuit unit 6, and position detection waiting unit 19 that determines the start of sampling for magnetic pole position detection.

Furthermore, microprocessor 23 includes rotational speed detector 20 that calculates a rotational speed with respect to the output from position detection determiner 18, duty setter 22, and carrier outputter 21.

Brushless DC motor 203 is a six salient-pole concentrated-winding motor. Brushless DC motor 203 includes three-phase winding stator 203*a* and rotor 203*b*.

Stator 203*a* has a six-pole nine-slot structure. Stator 203*a* includes stator winding 203*u*, stator winding 203*v* and stator winding 203*w*.

Rotor 203*b* is internally provided with permanent magnet 203α, permanent magnet 203β, permanent magnet 203γ, permanent magnet 203δ, permanent magnet 203ε and permanent magnet 203ζ. Rotor 203*b* has a magnet embedded therein, the magnet generating a reluctance torque.

Inverter circuit unit 4 includes six three-phase bridge connected switching transistors Tru, Trx, Trv, Try, Trw and Trz, and freewheel diodes Du, Dx, Dv, Dy, Dw and Dz that are connected in parallel to the corresponding switching transistors.

Position detection circuit unit 6 is composed of a comparator (not shown) and the like. Position detection circuit unit 6 obtains a position detection signal through comparison between a terminal voltage signal based on the induced voltage of brushless DC motor 203 and a reference voltage performed by a comparator.

Position detection waiting unit 19 separates a spike voltage signal from the output signal of position detection circuit unit 6, and sets a wait time for extracting only the position detection signal.

Position detection determiner 18 obtains a position signal of rotor 203*b* from the output signal of position detection circuit unit 6 and generates the position detection signal.

Conduction angle controller 13 controls the conduction angle used by commutation controller 15 based on the position detection information obtained by position detection determiner 18. Conduction angle update timer 14 sets an update period for updating the conduction angle by conduction angle controller 13.

In response to the instruction of corrector 11, conduction angle controller 13 adjusts the conduction angle to a conduction angle that is proportional to the time for the electric motor to generate a reverse induction voltage.

Commutation controller 15 calculates the timing of commutation based on the position signal of position detection determiner 18 and the conduction angle of conduction angle controller 13. Then, commutation controller 15 generates commutation signals for switching transistors Tru, Trx, Trv, Try, Trw and Trz.

Rotational speed detector 20 performs operations such as counting the position signal obtained from position detection determiner 18 for a fixed period of time and measuring a pulse interval. The rotational speed of brushless DC motor 203 is thereby calculated.

Duty setter 22 performs addition and subtraction operations for the duty ratio based on the deviation between the rotational speed obtained from rotational speed detector 20 and the commanded rotational speed, and outputs the duty ratio to PWM controller 16.

Duty setter 22 increases the duty ratio if the actual rotational speed is lower with respect to the rotational speed command, and reduces the duty ratio if the actual rotational speed is higher with respect to the rotational speed command.

Duty setter 22 sets the duty ratio to a duty ratio that is less than or equal to the present duty ratio if an instruction is received from corrector 11.

Carrier outputter 21 sets a carrier frequency for switching switching transistors Tru, Trx, Try, Try, Trw and Trz. In the present embodiment, the carrier frequency is set between 3 kHz and 10 kHz.

PWM controller 16 outputs a PWM modulation signal based on the duty ratio set by duty setter 22 and the carrier frequency set by carrier outputter 21.

Drive controller 17 combines the commutation signal, the PWM modulation signal and the conduction angle with an advancing angle so as to generate a drive signal (control signal) for switching switching transistors Tru, Trx, Try, Try, Trw and Trz between on and off. Then, drive controller 17 outputs the drive signal to drive circuit 5.

Drive circuit 5 switches switching transistors Tru, Trx, Try, Try, Trw and Trz between on and off based on the drive signal, and drives brushless DC motor 203.

Hereinafter, the operations and effects of the compressor driving device configured as described above will be described.

Various types of waveforms of compressor driving device 24 will be described with reference to FIG. 2. Compressor driving device 24 controls brushless DC motor 203 with a conduction angle of 150 degrees and an advancing angle of 15 degrees.

Conduction angle controller 13 sets the maximum value to be 150 degrees and the minimum value to be 120 degrees.

As shown in FIG. 2, the phases of U phase terminal voltage Vu, V phase terminal voltage Vv and W phase terminal voltage Vw of brushless DC motor 203 are shifted by 120 degrees from each other. Here, the voltages supplied to stator windings 203U, 203V and 203W by inverter circuit unit 4 are respectively referred to as supply voltages Vua, Vva and Vwa.

Also, induced voltages generated in stator windings 203U, 203V and 203W are respectively referred to as induced voltages Vub, Vvb and Vwb. And, pulsed spike voltages that occur as a result of any one of freewheel diodes Du, Dx, Dv, Dy, Dw and Dz of inverter circuit unit 4 conducting at the time of commutation switching are respectively referred to as spike voltages Vuc, Vvc and Vwc.

At this time, terminal voltages Vu, Vv and Vw are combined waveforms of supply voltages Vua, Vva and Vwa, induced voltages Vub, Vvb and Vwb and spike voltages Vuc, Vvc and Vwc.

Comparator output signals PSu, PSv, PSw are determined through comparison of comparing terminal voltages Vu, Vv and Vw with virtual neutral voltage VN that is ½ the DC power voltage.

Also, spike voltages Vuc, Vvc and Vwc can be ignored because position detector 12 has a wait time. For this reason, comparator output signals PSu, PSv and PSw indicate the positive and negative signs and the phases of induced voltages Vub, Vvb and Vwb.

Here, if the DC power voltage drops rapidly, the actual rotational speed of brushless DC motor 203 decreases in proportion to the rate of change of the DC power voltage.

Also, a zero crossing point that is a crossing point where the induced voltage intersects with virtual neutral voltage VN is included in an energization section, which makes it difficult to perform detection.

If, on the other hand, the DC power voltage rises rapidly, the actual rotational speed of brushless DC motor 203 rises rapidly. Then, the zero crossing point is included in the spike voltage, which makes it difficult to perform detection.

In either case, there is a possibility of a false detection of the magnetic pole position of the rotor, causing a loss of synchronization. For this reason, there is a possibility that brushless DC motor 203 cannot be driven and controlled in a favorable manner.

Commutation controller 15 waits until a commutation time elapses after position detection waiting unit 19 of microprocessor 23 starts a timer to perform a count operation. After the elapse of the commutation time, the drive signal is output to drive circuit 5, and a commutation operation is performed.

At the time of the commutation operation, pulsed spike voltages Vuc, Vvc and Vwc are generated during a period from immediately after the state of any one of switching transistors Tru, Trx, Trv, Try, Trw and Trz in inverter circuit unit 4 is switched from on to off until the energy stored in stator winding 203u, stator winding 203v and stator winding 203w that were conducting until just before is discharged by conduction of any one of freewheel diodes Du, Dx, Dv, Dy, Dw and Dz.

Position detector 12 ignores spike voltages Vuc, Vvc and Vvw, and thereafter performs position detection for detecting the magnetic pole position based on the cross points where induced voltages Vub, Vvb and Vwb pass through virtual neutral voltage VN.

Corrector 11 further applies correction on a comparison value according to the number of rotations and the conduction angle, the comparison value being used for comparison with the input power value, which is the product of the detection value detected by voltage detector 9 and the detection value detected by current detector 10. If the input power value exceeds the comparison value, corrector 11 provides, to duty setter 22, an instruction to suppress the duty ratio such that the input power that is input into the compressor is substantially equal to a predetermined value. In this way, by increasing or decreasing the basic number of rotations of the electric motor, the input power that is input into the compressor can be controlled to a constant value that is substantially equal to the predetermined value (hereinafter, this control will be referred to as "constant input power control"). For this reason, the compressor can perform operation without being shut down.

Also, as a result of duty setter 22 adjusting the duty ratio, a reverse induction voltage application time is changed. By adjusting the conduction angle in proportion to the reverse induction voltage application time, control can be performed so as to maintain the voltage and current phases to be within predetermined values. For this reason, it is possible to safely drive the compressor without shutting down the compressor.

Voltage detector 9 detects the voltage of the DC power voltage supplied to inverter circuit unit 4 by using an inexpensive resistive voltage divider composed of a resistor as an input. Current detector 10 detects the current flowing into the compressor by using, as an input, a voltage resulting from amplification of the voltage detected by low-resistant and inexpensive shunt resistor 8 by using an operational amplifier.

Hereinafter, details of the constant input power control will be described with reference to a flowchart.

The constant input power control is for preventing a shutdown of the compressor caused in the event of an overload or by drive control that tracks rapid current changes and voltage changes caused by voltage variations, load variations and the like. In the constant input power control, in the case where the input power value exceeds the comparison value obtained by applying correction according to the number of rotations and the conduction angle to a pre-set set value, the duty ratio is changed so as to control the input power that is input into the compressor to be constant.

Alternatively, in the case where the input power value obtained by applying correction according to the number of rotations and the conduction angle exceeds a pre-set comparison value, the duty ratio is changed so as to control the input power that is input into the compressor to be constant.

FIG. 3 is a control macro flowchart illustrating constant input power control performed in the compressor driving device according to Embodiment 1 of the present invention.

In FIG. 3, first, in operation processing (step 100), input power value calculation processing and processing of determining whether to start or release constant input power control are performed. Next, in constant input power control (step 200), in order to perform constant input power control, the duty ratio for increasing or reducing the number of rotations according to the result of comparison between the input power value and the comparison value is set. Furthermore, considering the control performance such as insufficient output, it is desirable to perform conduction angle setting (step 300).

FIG. 4 is a flowchart illustrating control operations for the operation processing performed in the compressor driving device according to Embodiment 1 of the present invention. FIG. 5 is a flowchart illustrating the operations for setting the duty ratio in the constant input power control performed in the compressor driving device according to Embodiment 1 of the present invention.

FIG. 4 shows the details of the operation processing (step 100) shown in FIG. 3, and FIG. 5 shows the details of the constant input power control (step 200) shown in FIG. 3.

The operation processing shown in FIG. 4 will be described. In the operation processing, first, the comparison value for comparing with the input power value in constant input power control is corrected according to the number of rotations and the conduction angle (step 101).

First, correction of the comparison value according to the number of rotations will be described. For example, in the case where the present number of rotations is high, "comparison value=set value" is set. In the case where the present number of rotations is low, "comparison value=set value+ number of rotations corrected" is set. That is, correction is performed so as to set the comparison value to be greater as the number of rotations is lower.

The correction according to the number of rotations described above does not need to be performed when the detection of current input is performed according to the electrical angle for each number of rotations. However, the correction according to the number of rotations needs to be performed when the detection of current input is performed in a certain time interval.

The lower the rotational speed of the electric motor is, the more the period of current waveforms is delayed. Accordingly, the number of waveform peaks included in the certain time interval is sparse, and a smaller detection value is detected. In contrast, the higher the rotational speed of the electric motor is, the more the period of current waveforms is advanced. Accordingly, the number of waveform peaks included in the certain time interval is dense, and a greater detection value is detected.

In this way, even when the input power that is input into the compressor is the same, depending on the method of detecting input power, a difference occurs in the detection value due to the number of rotations. For this reason, such inconsistencies are removed by applying correction according to the number of rotations.

Next, correction of the comparison value according to the conduction angle will be described. In the case where the conduction angle is greater than 120 degrees, energization overlaps with another phase, causing a substrate loss. However, a loss in input power due to the substrate loss does not appear in the voltage and current flowing into brushless DC motor 203. Accordingly, in order to make the input power constant, it is necessary to take the substrate loss into consideration.

For this reason, in the case where the conduction angle is greater than 120 degrees, a predefined substrate loss is set as a correction value, and the correction value is subtracted from the comparison value so as to perform correction to obtain a value slightly smaller than the comparison value when the conduction angle is 120 degrees or less. That is, "comparison value=set value−correction value" is set.

Furthermore, correction of the number of rotations according to the resonant bandwidth will be described. For example, in the case where the target number of rotations is not in the resonant bandwidth, "comparison value=set value" is set. In the case where the target number of rotations is in the resonant bandwidth, "comparison value=set value−the number of rotations corrected" is set.

That is, in order to make the input power that is input into the compressor constant, when there is a resonant bandwidth within a range of the number of rotations where the number of rotations is reduced, the target value for the number of rotations (the target number of rotations) is reduced so as to avoid the resonant bandwidth. When the target number of rotations is reduced to the upper limit of the resonant bandwidth, the target number of rotations is set to the lower limit value of the resonant bandwidth while avoiding the resonant bandwidth.

It is thereby possible to avoid a situation in which the number of rotations falls in the resonant bandwidth. Furthermore, adding the correction value to the comparison value makes it more difficult to cause the constant input power control to be released than in normal operation.

The reason for performing a correction that makes it difficult to cause the constant input power control to be released in the above manner will be described. If the comparison value is set to the same as in normal operation and the number of rotations is reduced while avoiding the resonant bandwidth, the target number of rotations is reduced more by an amount corresponding to the number of rotations that falls in the resonant bandwidth than the target number of rotations that makes the input power that is input into the compressor constant during normal operation. For this reason, the constant input power control may be immediately released. If the constant input power control is released in this state, the number of rotations is increased again so as to exceed the resonant bandwidth.

However, inherently, the constant input power control was performed due to the input power value exceeding the comparison value at the upper limit of the resonant bandwidth. Accordingly, when the input power value again exceeds the comparison value at the upper limit of the resonant bandwidth, the constant input power control is performed. After that, control is performed to reduce the target number of rotations while avoiding the resonant bandwidth range. For this reason, in the worst case, a situation may occur in which the number of rotations repeatedly moves back and forth on the resonant bandwidth. In order to prevent this, a correction that makes it difficult to cause the constant input power control to be released is performed.

That is, the comparison value when the target number of rotations falls in the resonant bandwidth is set to be less than the comparison value when the target number of rotations is less than or equal to the resonant bandwidth.

For example, a case will be described in which the input power that is input into the compressor is controlled to be constant at 200 W±10 W. When the target number of rotations does not fall in the resonant bandwidth, a condition for releasing the constant input power control can be set such that the constant input power control is released if the input power that is input into the compressor reaches 190 W or less. On the other hand, when the target number of rotations falls in the resonant bandwidth, it is necessary to set the release condition at the lower limit of the resonant bandwidth so as to be capable of performing operation with an input power of less than 200 W at the upper limit of the resonant. Accordingly, for example, the release condition for releasing the constant input power control is set such that the constant input power control is released if the input power that is input into the compressor reaches 170 W or less.

There is no limitation on the means for achieving these settings, and it is possible to use a method in which a pre-set value is used or a method in which a value is set with respect to the input power that is input into the compressor at the present number of rotations.

As described above, when the target number of rotations falls in the resonant bandwidth, the comparison value for constant input power control is set to a value obtained by subtracting the correction value from the comparison value for constant input power control during normal operation. It is thereby possible to control the input power that is input into the compressor to be constant without causing the number of rotations repeatedly moving back and forth on the resonant bandwidth a plurality of times and without shutting down the operation while avoiding the number of rotations in the resonant bandwidth range.

The operation processing will be further described by referring back to the flowchart shown in FIG. 4. After the processing of step 101, the procedure transitions to step 102, where the input power value is calculated. A product (for example, average voltage value in one second×average current value in one second) of the average value of the voltage values detected during a certain time interval (for example, one second) by voltage detector 9 and the average value of the current values detected during a certain time interval (for example, one second) by current detector 10 is calculated (step 102).

Here, the purposes of using the input voltage and the input current as the average values during certain time intervals will be described. One of the purposes is to correct the present state without disturbing feedback control by some voltage variation, current variation or the like during the process of bringing the number of rotations of the compressor to the target value while making a comparison between the target number of rotations and the present number of rotations. By taking some voltage variation, current variation or the like as a disturbance (noise), it is possible to perform stable control even if there is some voltage variation or current variation.

Furthermore, another purpose is to perform stable control in the compressing step and discharging step that are performed by the compressor without any influence of variations in the number of rotations caused as a result of the amount of torque required for the section being different between these steps.

It is also possible to perform, on the product of the voltage value detected by voltage detector 9 and the current value detected by current detector 10, another correction that is different from the correction performed in step 101.

The purpose of this correction will be described. From the viewpoint of variation factors in voltage and current, the voltage has a variation factor by variation of the supply voltage of commercial AC power supply 1 or the influence of power supply line impedance. The current has a variation factor due to the load state in the refrigeration cycle.

As described above, the voltage and the current have different variation factors. Accordingly, in order to perform stable control against disturbance on the whole rotation number control system, two disturbances are detected so as to perform correction. By doing so, the variation factors that affect the voltage and the current can be removed as much as possible. It is also possible to implement highly accurate rotation number control sufficient to detect a rotational irregularity per rotation for calculating the amount of torque required for the section in each of the compressing step and discharging step that are performed by the compressor. The correction value itself is a matter of design because, for example, in the current detection or the like, the detection method, variations and the like are included.

Here, the interval (one second in the example described above) over which averaging is performed is set according to the degree of stability. For example, in the case where there is little factor for steady state voltage variation and a reaction is desired to take place at the time of occurrence of a significant voltage variation, it is necessary to set the average time of the voltage value to be short, and thus the averaged interval may be set to 100 milliseconds. That is, the time over which averaging is performed may be set according to the time required to filter each variation factor and the time in which a reaction is desired to quickly take place during the steady state.

Also, the averaging according to the present embodiment includes the case where averaging is performed on immediate values sampled every predetermined time interval, the case where averaging is performed by subtracting a maximum value or a minimum value as noise processing, and the case where moving average in which a time determined by an average value is further divided to obtain each average value, which is then averaged stepwise is performed.

Furthermore, the averaging according to the present embodiment includes the case where a calculation method in which a limited update value is added or subtracted to or from the present value is used. This calculation method is a calculation method in which, for example, if the present value is 20 and the input value is 40, the update value with respect to the present value is limited to ±1, and the value is changed stepwise such as 21, 22 and so on, without immediately changing from 20 to 40.

That is, the average value according to the present embodiment not only indicates a simple average value, but also includes processing such as removal of noise added to the average value.

Also, in step 102, the average value during the certain time interval of the voltage value or the current value used to calculate the input power value may be used as a representative value described below. The representative value refers to one of a plurality of average values within a period of time whose amount of change from the immediately preceding average value is less than or equal to a first threshold value, the period of time (referred to as "stable time" in this specification) being longer than the certain time interval used in averaging. Here, it is desirable that the first threshold value is set to an amount of power that is about 10% of the maximum amount of input power allowed to be input into the compressor.

The reason for using the representative value within the stable time as described above will be given here. Upon activation of the compressor, the number of rotations reaches the target number of rotations in several seconds. However, the pressure of the refrigeration cycle circuit does not undergo a rapid change like the number of rotations of the compressor, but undergoes a change with gradual variation.

Also, in the case of a refrigerator or the like, the suction pressure of the compressor decreases gradually from the equilibrium pressure before the activation of the compressor. For this reason, immediately after the activation of the compressor, the suction pressure is high and the load imposed on the compressor is very large, but after that, the load is reduced as the suction pressure decreases.

When the load imposed on the compressor is changed by the pressure variation as described above, the voltage value and the current value are also changed. It is necessary to separately consider the change in the voltage value and the current value caused by the pressure variation and the change in the voltage value and the current value when the pressure is stable. That is, if the duty ratio is changed by using the input power calculated from the voltage value and the current value that are dramatically changed by the pressure variation, the increase and decrease in the number of rotations may be too significant.

Accordingly, by using the average value whose amount of change from the immediately preceding average value is less than or equal to a first threshold value, unwanted changes in the number of rotations can be eliminated, and the compressor can be operated in a stable manner.

That is, the certain time interval used for averaging is the time provided to remove the influence due to disturbance in the state in which the operation of the compressor is stable. On the other hand, the stable time is the time provided to, when changes in the load due to the pressure condition and environmental factor such as at the time of activation are known in advance, remove the influence of such changes.

As in the above description, when the elapsed time after the activation of the compressor is included in the stable time, it is desirable to use the average value whose amount of change from the immediately preceding average value is less than or equal to a first threshold value as the average value of voltage values or current values during a certain time interval used to calculate the input power value. However, the present invention is not limited thereto, and it is also possible to consistently use the average value whose amount of change from the immediately preceding average value is less than or equal to a first threshold value as the average value of voltage values or current values during a certain time interval used to calculate the input power value.

The operation processing will be further described by referring back to the flowchart shown in FIG. 4. After the processing of step 102, the procedure transitions to step 103, where it is determined whether or not the present operating state is under constant input power control. If it is determined that the present operating state is under constant input power control, the procedure transitions to the next step 104.

In step 104, it is determined, based on the presence or absence of a change in the appliance-side condition, whether or not to release the constant input power control.

The change in the appliance-side condition can be, for example, a change where the power required by the refrigerator becomes low, or a change where the target number of rotations instructed from the refrigerator becomes lower than the number of rotations that is suppressed by the present constant input power control.

The power required by the refrigerator becomes low when the input power that is input into the compressor falls below a value to which limitation is desired. For this reason, the subtraction of the duty ratio, or in other words, the limitation of the number of rotations is unnecessary, and thus no problem arises if the constant input power control is released.

Also, when the target number of rotations instructed from the refrigerator becomes lower than the number of rotations that is suppressed by the present constant input power control, priority is given to the target number of rotations instructed from the refrigerator, and thus control is performed by using the instructed target number of rotations that is lower than the number of rotations that is suppressed by the constant input power control. For this reason, it is unnecessary to perform the constant input power control, and thus no problem arises if the constant input power control is released.

If a change in the appliance-side condition as described above is satisfied, the constant input power control is released (step 105).

The release condition at this time is desirably set to, if the power required by the refrigerator becomes low, "input power value<comparison value−hysteresis". If the target number of rotations instructed from the refrigerator is changed, the release condition is desirably set to "number of rotations<target number of rotations (−number of rotations to which variation is allowed)". By providing a predetermined hysteresis with respect to the release condition as described above, a value that does not undergo repetition of on and off (start and release) of the constant input power control can be used as the threshold value. For this reason, particularly even when a variation is likely to occur in the loaded state or when a variation is partially required with respect to the number of rotations due to the cylinder volume of the compressor, stable control can be performed.

If a change in the appliance-side condition as described above is not satisfied, in order to continue the constant input power control, the procedure transitions to step 200 shown in FIG. 3.

Next, if it is determined in step 103 that the present operating state is not under constant input power control, or in other words, it is determined that normal rotation number control is performed, a comparison is made between the comparison value calculated in step 101 and the input power value calculated in step 102 (step 106).

If the input power value is greater than the comparison value (input power value>comparison value), it is determined that a condition for suppressing the input power value is satisfied, and then the procedure transitions to constant input power control (step 107).

If the input power value is less than or equal to the comparison value (input power value≤comparison value), a comparison is made between the detection value detected by temperature detector 3 and a predetermined temperature (for example, 90° C.) (step 108).

If the detection value detected by temperature detector 3 is greater than the predetermined temperature, it is determined that the load of the compressor is high and the input power into the compressor is highly likely to increase, and then the procedure transitions to constant input power control (step 107). If the detection value detected by temperature detector 3 is less than or equal to the predetermined temperature, in order to continuously perform normal control, the procedure transitions to step 200 shown in FIG. 3.

The constant input power control shown in FIG. 5 will be described next. First, a comparison is made between the actual number of rotations, which is the actual number of rotations of the compressor, and the target number of rotations (step 201).

If the actual number of rotations is greater than the target number of rotations (actual number of rotations>target number of rotations), this corresponds to, for example, one of the changes in the appliance-side condition described with reference to step 104 shown in FIG. 4, to be more specific, the change where the target number of rotations instructed from the refrigerator becomes lower than the number of rotations that is suppressed by the present constant input power control. In this case, deceleration control for simply decelerating to the target number of rotations is performed rather than controlling the input power that is input into the compressor to be constant. For this reason, in step 204, as normal control, deceleration processing for decelerating the actual number of rotations to the target number of rotations is performed by subtracting the duty ratio.

If the actual number of rotations is less than or equal to the target number of rotations (actual number of rotations≤target number of rotations), the procedure transitions to step 202. In step 202, it is determined whether or not the present operating state is under constant input power control.

If it is determined that the present operating state is not under constant input power control, the procedure transitions to step 204. This state is either the state in which the actual number of rotations is less than or equal to the target number of rotations, or in other words, the actual number of rotations and the target number of rotations are equal and it is unnecessary to perform any processing, or the state in which the actual number of rotations has not reached the target number of rotations and it is necessary to perform acceleration. For this reason, in step 204, as normal control, steady processing (for maintaining the output) or acceleration processing for accelerating to the target number of rotations by increasing the duty ratio is performed.

If it is determined in step 202 that the present operating state is under constant input power control, the procedure transitions to step 203.

In step 203, it is determined whether the input power value is greater than a comparison value by more than a predetermined value α. The predetermined value α is a value of about 1% of the comparison value. For example, if the comparison value is 200 W, the predetermined value α is set to 2 W. If the difference between the input power value and the comparison value is less than or equal to the predetermined value α, the procedure transitions to step 205. In step 205, the output is maintained without updating the duty ratio.

The input power that is input into the compressor may slightly vary even during the steady operation. If the duty ratio is changed due to the slight variation, the stability of control may be compromised. Accordingly, in steps 203 and 205, if the variation of the input power value is less than the predetermined value α, the duty ratio is not updated, thereby preventing the control from becoming unstable.

If it is determined in step 203 that the input power value is greater than the comparison value by more than the predetermined value α, the procedure transitions to step 206. In step 206, it is determined whether or not the input power value is greater than the comparison value by more than a predetermined value β. The predetermined value β is a value that is greater than the predetermined value α, and is a value of about 5% of the comparison value. For example, if the comparison value is 200 W, the predetermined value β is 10 W. The predetermined value β is also an upper limit of the allowed value for constant input power control.

If the input power value is greater than the comparison value by more than the predetermined value α (input power value>comparison value+α) and is greater than the comparison value by more than the predetermined value β (input power value>comparison value+β), the procedure transitions to step 208. In this case, the input power value is greater than the allowed value for constant input power control. Thus, in step 208, control is performed such that the subtracted value of the duty ratio is increased to accelerate the reduction of the number of rotations, and to cause the difference between the input power value and the comparison value to be less than the predetermined value β.

If, on the other hand, the difference between the input power value and the comparison value is less than or equal to the predetermined value β (input power value≤comparison value+β), the procedure transitions to step 207. In this case, the input power value is within the allowed value for constant input power control. For this reason, control is performed so as to reduce the subtracted value of the duty ratio to reduce the number of rotations and to cause the difference between the input power value and the comparison value to be less than the predetermined value α.

As described above, if the difference between the input power value and the comparison value is small, by reducing the amount of subtraction of the duty ratio, the input is gradually converged within the allowed value. For this reason, it is possible to perform rotation number control that does not involve a rapid current change.

With this configuration, it is possible to suppress the occurrence of voluntary load variation and noise caused by a significant current change.

In the present embodiment, the rate of reduction of the duty ratio is changed in two stages: when the input power value is greater than the comparison value by more than the predetermined value α; and when the input power value is greater than the comparison value by more than the predetermined value β. However, in the case where the variation of the input power that is input into the compressor due to the acceleration/deceleration of the number of rotations or the load is large depending on the system condition of the refrigerator and the environment of the compressor, the rate of reduction of the duty ratio may be changed in multiple stages. With this configuration, it is possible to perform more stable constant input power control.

The conduction angle setting (step 300) shown in FIG. 3 will be described next. In order to perform the rotation number control of the brushless DC motor, it is necessary to detect the magnetic pole position of the rotor. For this reason, position detection circuit unit 6 generates a position detection signal by using an induced voltage generated in the rotor winding having an inductance component. Conduction angle controller 13 performs wide-angle control (a conduction angle of 150 degrees) by changing the conduction angle according to the position detection signal.

However, if the load current increases due to the overload state and the waveform of the voltage supplied to the brushless DC motor is distorted, the reverse induction voltage generated at the timing of switching the energization is buried in the AC voltage. For this reason, position detection circuit unit 6 may not be able to detect a zero crossing point.

In PWM control, commutation control, rotational speed calculation and conduction angle control are performed based on the position detection signal. For this reason, the position detection signal is an important factor for performing PWM, and this operational reliability affects the operational reliability of the whole system.

The timing of generation of the reverse induction voltage is a timing at which energization is switched, or in other words, a timing of voltage phase. Also, after that, the timing at which the reverse induction voltage reaches zero is a timing at which the current phase reaches zero.

For this reason, the relationship between voltage and current phases can be obtained from this reverse induction voltage, and thus the rotational position of the rotor can be estimated. Performing control such that the induced voltage is not buried in the reverse induction voltage is equivalent to performing control so as to maintain the voltage and current phases to be constant. That is, as long as the rotation position of the rotor can be detected, it is possible to determine that stable control is performed.

The length of time during which the reverse induction voltage is applied (referred to as "reverse induction voltage width") takes the same value as the electrical angle per number of rotations on the time axis if the load is the same. To rephrase it, the voltage width is reduced as the number of rotations increases. For this reason, corrector 11 sets the conduction angle such that the reverse induction voltage width does not hinder the detection of the induced voltage. It is thereby possible to maintain the voltage phase and the current phase to be constant.

As described above, in the present embodiment, as a result of the detection value being averaged and constant input power control being performed to suppress the duty ratio by using the input power voltage, which is the product of the average current value and the average voltage value, and the comparison value, even in the event of an overload, it is possible to perform stable rotation number control by using the constant input power value.

Also, by using, as the detection value, one of a plurality of averaged detection values whose amount of change from the immediately preceding value is less than or equal to a predetermined amount of change, the change in the detection value due to a rapid change in the load can be removed, and stable rotation number control can be performed.

Also, by performing conduction angle control on the reverse induction voltage width in a position detectable state, even during the constant input power control, the relationship between voltage and current phases is maintained at a constant relationship, and thus the rotational position of the rotor is appropriately controlled. For this reason, the detection reliability for detecting the position signal is enhanced, and it is possible to perform rotation number control having a high reliability against overload and fine rotation number control.

Also, noise within circuits is also reduced, and thus the risk of malfunction of position detector 12 is reduced, and stable rotation number control can be performed.

Figure 6:
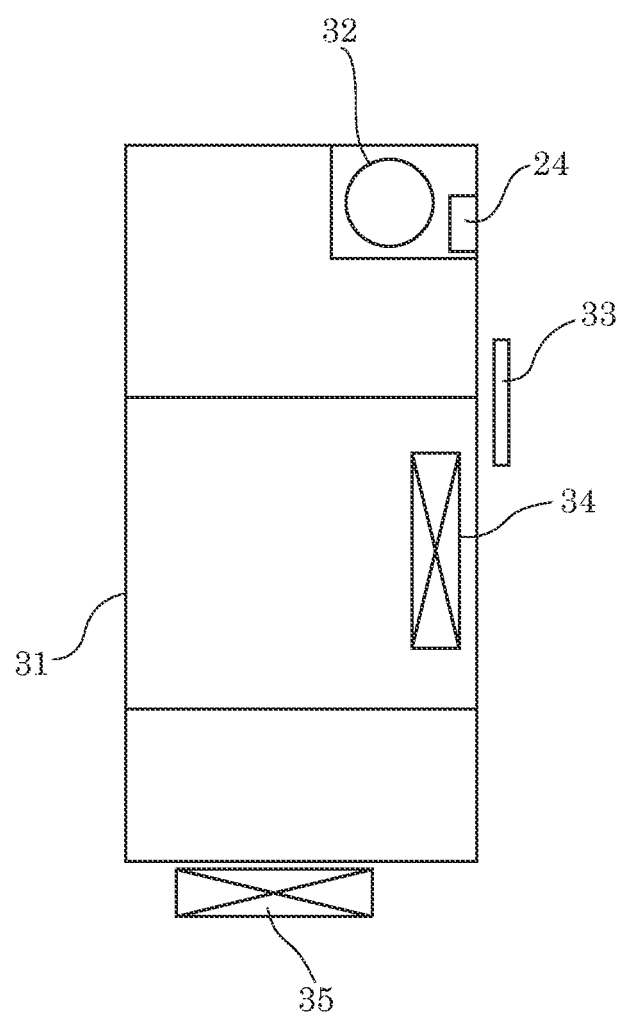
FIG. 6 is a configuration diagram of a refrigeration cycle apparatus incorporating the compressor driving device according to Embodiment 1 of the present invention.
Figure 7:
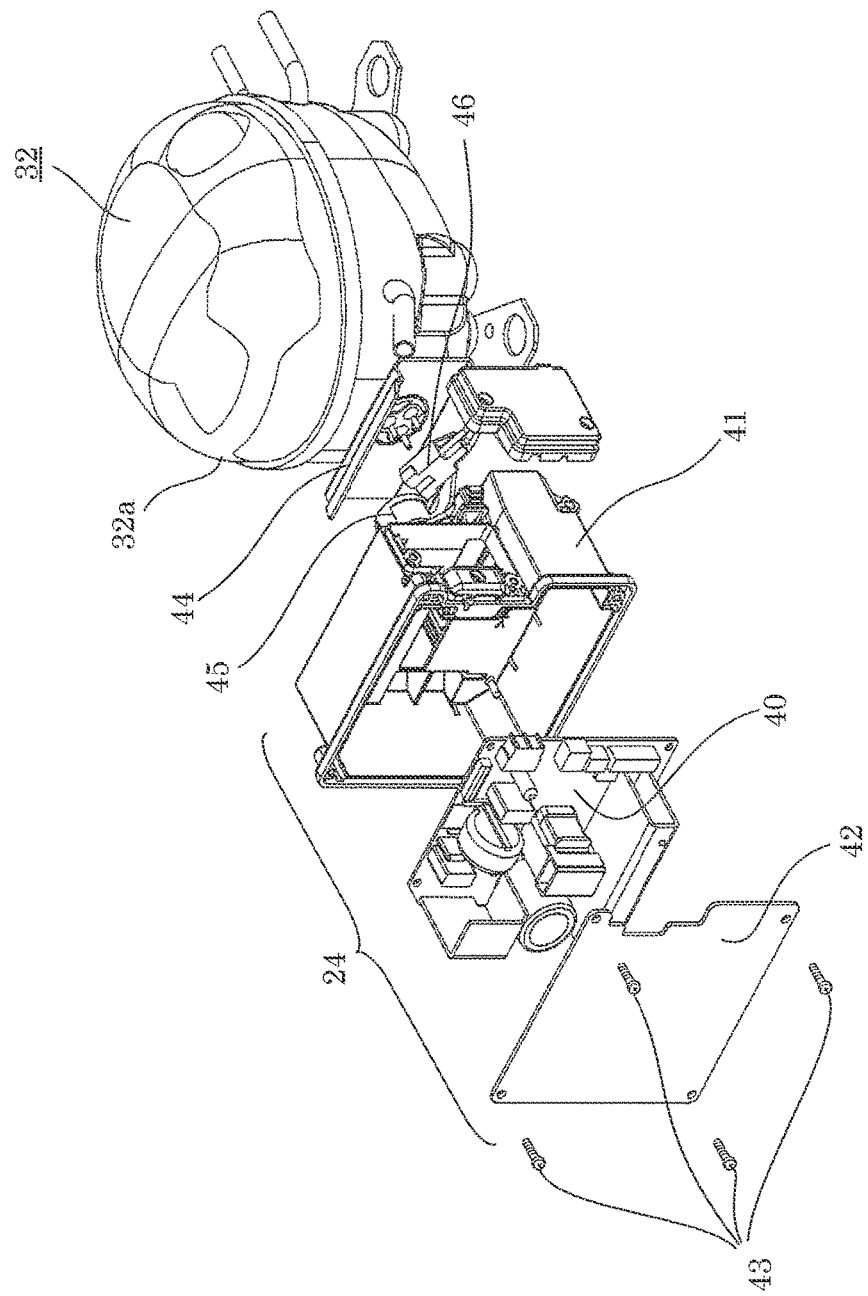
FIG. 7 is an exploded perspective view of a compressor to which the compressor driving device is attached.
Figure 8:
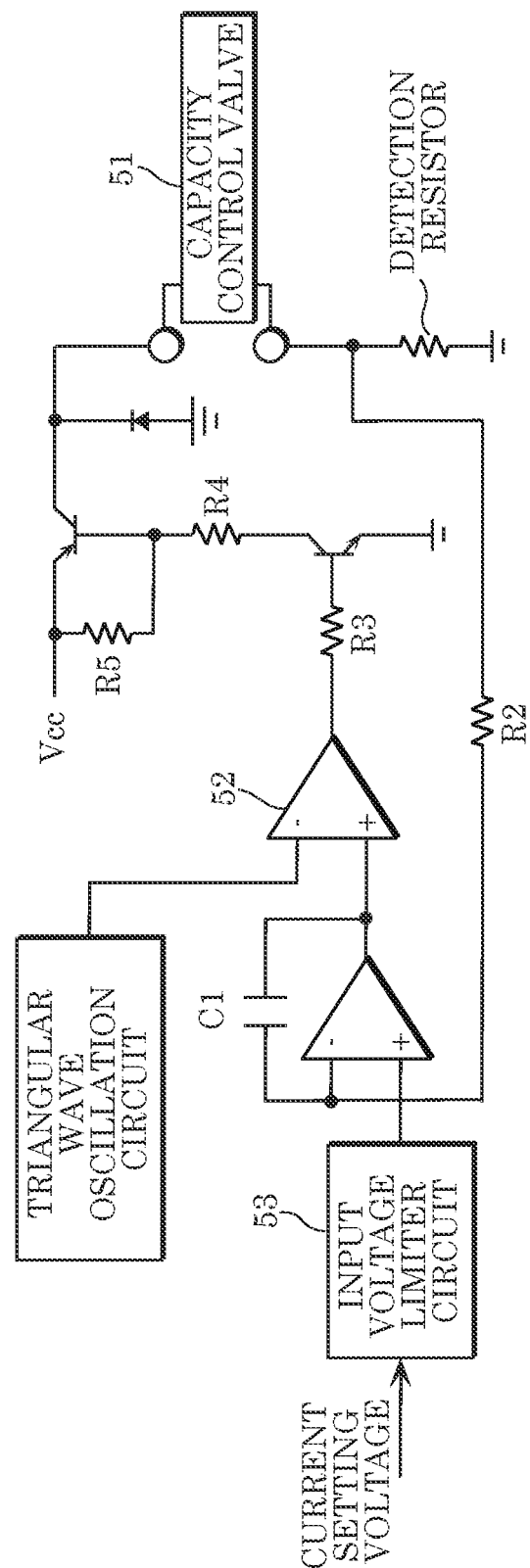
FIG. 8 is a circuit diagram showing a conventional capacity control valve control apparatus.
Figure 9:
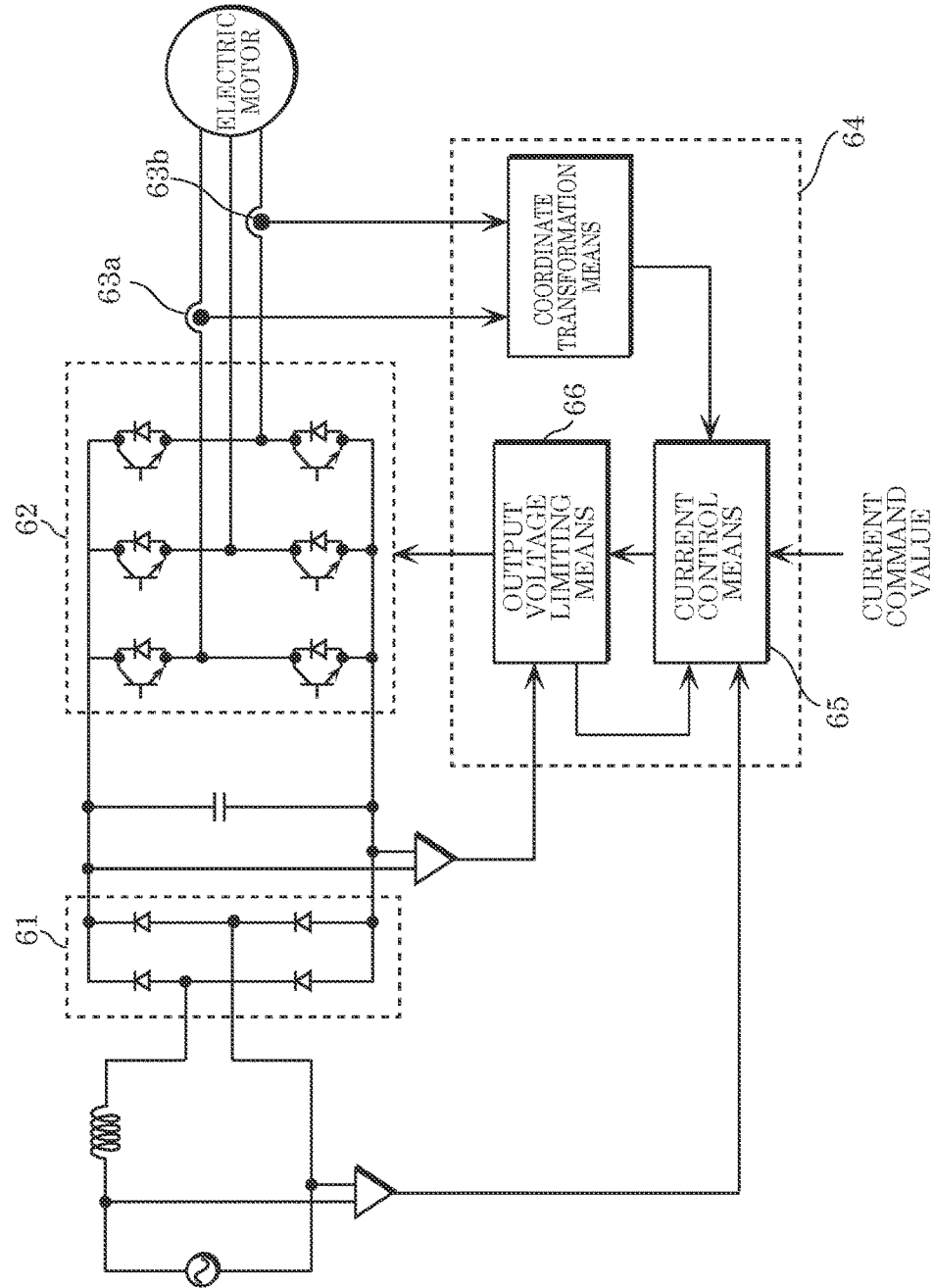
FIG. 9 is a circuit block diagram of a conventional electric motor driving apparatus and a conventional compressor driving device.

FIG. 6 is a schematic configuration diagram of a refrigerator incorporating a compressor driving device. FIG. 7 is an exploded perspective view of a compressor to which the compressor driving device is attached.

In FIG. 6, refrigerator 31 includes a refrigeration cycle circuit including compressor 32 that is driven by compressor driving device 24, heat dissipator 33 that dissipates heat of a gas refrigerant at a high temperature and a high pressure that has been compressed by compressor 32, a decompressor (not shown) that decompresses the refrigerant after heat dissipation, and evaporator 34 that evaporates the decompressed refrigerant so as to cool the inside of the refrigerator. The refrigeration cycle circuit may include second evaporator 35 that further evaporates the refrigerant. Compressor 32 and compressor driving device 24 are provided so as to be adjacent to each other.

Desirably, as shown in FIG. 7, compressor driving device 24 is attached in contact with outer shell 32*a* of compressor 32.

Compressor driving device 24 includes printed circuit board 40, storage box 41 and cover 42. Printed circuit board 40 includes a semiconductor element constituting inverter circuit unit 4, microprocessor 23, a thermistor constituting temperature detector 3, and the like that are mounted thereon. Storage box 41 stores printed circuit board 40 and has an attachment leg (not shown) that is directly attached to compressor 32. Cover 42 closes the opening of storage box 41. Cover 42 is formed by using a metal material having good thermal conductivity and is fixed to storage box 41 by means of bolts 43.

Compressor 32 includes outer shell 32*a* in which an electric motor and a compression mechanism are stored, and bracket 44 welded to outer shell 32*a*. Compressor driving device 24 is attached to bracket 44 via the attachment leg (not shown). Bracket 44 is internally provided with overload protector 45 connected from compressor driving device 24 by a wire and cluster connector 46 that supplies power to the electric motor of compressor 32.

When compressor driving device 24 performs operation, power is supplied to the electric motor so as to rotate the electric motor. Compressor 32 is thereby operated to compress the refrigerant. At this time, compressor 32 generates heat as a loss. The generated heat is conducted to storage box 41, printed circuit board 40, and temperature detector 3 provided on printed circuit board 40 via bracket 44.

The heat conducted from compressor 32 increases as the load of compressor 32 is larger. For this reason, temperature detector 3 can also indirectly detect the load of compressor 32.

For this reason, as explained with reference to step 108 shown in FIG. 4, if the detection value detected by temperature detector 3 is high, it is determined that the load of compressor 32 is large, and the duty ratio is reduced, as a result of which the input power that is input into the compressor can be controlled to be constant. With this configuration, even in the event of an overload, it is possible to perform stable control.

Compressor driving device 24 does not need to use a heavy component such as a reactor because a rapid current change does not occur as a result of the constant input power control being performed. For this reason, there is no variation in the harmonic component caused by a change in the reactor characteristics due to heat from compressor 32. Also, there is no reduction in the reliability caused by vibration of compressor 32. Also, the space into which compressor driving device 24 is incorporated in the refrigeration cycle apparatus is reduced.

The present embodiment has been described by using a refrigerator as the refrigeration cycle apparatus, but any other refrigeration cycle apparatus such as, for example, a vending machine may be used.

INDUSTRIAL APPLICABILITY

As described above, the compressor driving device according to the present invention can perform stable constant input power control even in the event of an overload by including a current detector that can be formed by using an inexpensive shunt resistor, a voltage detector that can be formed by using an inexpensive divider circuit, and a corrector. For this reason, it is possible to continue safe operation of the compressor without shutting down the compressor. Accordingly, the present invention is applicable to applications where a rapid variation in power supply voltage or the influence of overload state is considered to take place, including household electric appliances such as an air conditioner, a refrigerator and a washing machine, and electric vehicles. Also, the present invention is particularly useful in electric appliances used in a regional area where the power supply voltage frequently varies.

The invention claimed is:

1. A compressor driving device, comprising:
   a power conversion circuit that supplies power to an electric motor included in a compressor;
   a drive circuit that drives the power conversion circuit according to a control signal;
   a voltage detector that detects a voltage that is output to the electric motor;
   a current detector that detects a current that is output to the electric motor; and
   a controller,
   wherein when a product of a detection value of the voltage detector and a detection value of the current detector is greater than a predetermined comparison value, the controller reduces a duty ratio of the control signal and cause the power supplied to the electric motor by the power conversion circuit to have a predetermined power level or less.

2. The compressor driving device according to claim 1, comprising:
   a corrector that corrects, according to the number of rotations of the electric motor, either the product of the detection value of the voltage detector and the detection value of the current detector or the comparison value.

3. The compressor driving device according to claim 1, comprising:
   a corrector that corrects, according to a conduction angle of the electric motor, either the product of the detection value of the voltage detector and the detection value of the current detector or the comparison value.

4. The compressor driving device according to claim 1, wherein the electric motor is a brushless DC motor including a rotor provided with a permanent magnet and a stator provided with a three-phase winding, and the controller PWM drives the electric motor at a three-phase output voltage.

5. The compressor driving device according to claim 1, wherein the controller adjusts a conduction angle of the control signal according to a length of time during which a reverse induction voltage is applied from the electric motor.

6. The compressor driving device according to claim 1, wherein the controller uses, as the detection value of the voltage detector or the detection value of the current detector, a detection value whose amount of change from an immediately preceding detection value is less than or equal to a first threshold value.

7. The compressor driving device according to claim 1, comprising:
   a temperature detector that detects a temperature of the compressor,
   wherein the controller reduces the duty ratio when a detection value of the temperature detector is greater than a predetermined value.

8. A compressor in which the compressor driving device according to claim 1 is attached in contact with an outer shell of the compressor.

9. A refrigeration cycle apparatus comprising a refrigeration cycle circuit including the compressor according to claim 8, an evaporator, a decompressor and a heat dissipator.

10. A refrigeration cycle apparatus comprising:
   a refrigeration cycle circuit including a compressor, an evaporator, a decompressor and a heat dissipator; and
   the compressor driving device according to claim 1.

* * * * *